(12) United States Patent
Keeton, Jr.

(10) Patent No.: US 7,279,104 B2
(45) Date of Patent: Oct. 9, 2007

(54) WASTE TREATMENT METHOD

(75) Inventor: Jimmie A. Keeton, Jr., Fort Collins, CO (US)

(73) Assignees: Waterpure Technologies, Inc., Bakersfield, CA (US); Keeton Industries, Inc., Bakersfield, CA (US)

( * ) Notice: Subject to any disclaimer, the term of this patent is extended or adjusted under 35 U.S.C. 154(b) by 74 days.

(21) Appl. No.: 11/380,887

(22) Filed: Apr. 28, 2006

(65) Prior Publication Data

US 2006/0186042 A1 Aug. 24, 2006

Related U.S. Application Data

(60) Continuation-in-part of application No. 11/205,434, filed on Aug. 16, 2005, now abandoned, which is a continuation of application No. 10/824,176, filed on Apr. 13, 2004, now Pat. No. 6,929,746, which is a division of application No. 10/265,518, filed on Oct. 3, 2002, now Pat. No. 6,743,357.

(60) Provisional application No. 60/327,101, filed on Oct. 3, 2001.

(51) Int. Cl.
*C02F 3/00* (2006.01)

(52) U.S. Cl. ............ 210/620; 210/629; 210/760; 210/758

(58) Field of Classification Search ........ 210/620–623, 210/629, 220, 610–611, 760, 758
See application file for complete search history.

(56) References Cited

U.S. PATENT DOCUMENTS

| | | | | |
|---|---|---|---|---|
| 3,577,678 | A | * | 5/1971 | Burton ............... 47/58.1 R |
| 6,117,324 | A | * | 9/2000 | Greene et al. ......... 210/627 |
| 6,372,140 | B2 | * | 4/2002 | Kelly ................ 210/629 |
| 6,929,746 | B2 | * | 8/2005 | Keeton, Jr. .......... 210/620 |

* cited by examiner

*Primary Examiner*—Chester T. Barry
(74) *Attorney, Agent, or Firm*—William W. Cochran; Cochran Freund & Young LLC

(57) ABSTRACT

Disclosed is a system and method for treating domestic and industrial biological waste using diffusers to force circulation and aerate a treatment lagoon. Several lagoons may be used in series to treat raw waste and different variations may be employed to stepwise process the waste. A blend of aerobic and anaerobic microbes is chosen to remove undesired species initially present in the waste or later formed therein, as well as to process the waste itself, depending on the nature of the waste. Aeration with slightly ozonated or oxygenated air facilitates rapid and complete processing of large amounts of waste.

11 Claims, 14 Drawing Sheets

WASTE TREATMENT METHOD

CROSS REFERENCE TO RELATED APPLICATIONS

This application is a continuation-in-part of U.S. patent application Ser. No. 11/205,434, for "Waste Stream Digestion Method," filed on Aug. 16, 2005 now abandoned by Jimmie A. Keeton, Jr., which is a continuation of U.S. patent application Ser. No. 10/824,176 for "Waste Stream Digestion Method," filed on Apr. 13, 2004 by Jimmie A. Keeton, Jr., now U.S. Pat. No. 6,929,746 which is a divisional of U.S. patent application Ser. No. 10/265,518, entitled "Waste Stream Digestion System," filed Oct. 3, 2002 by Jimmie A. Keeton, Jr., now U.S. Pat. No. 6,743,357, which was based upon and claims the benefit of U.S. Provisional Application Ser. No. 60/327,101 entitled "Waste Stream Digestion System," filed on Oct. 3, 2001 by Jimmie A. Keeton, the entire contents of which is hereby incorporated by reference for all it discloses and teaches.

FIELD OF THE INVENTION

The present invention relates generally to waste treatment and, more specifically, to waste processing using aeration and microbes.

BACKGROUND OF THE INVENTION

Anaerobic animal waste treatment systems are generally characterized by systems with liners or covered lagoons designed to mitigate smell and odor problems. Other systems include large biogas digesters. Anaerobic processes are very slow and rely on microbial decomposition reactions and processes that break down waste with no oxygen present. In addition, the anaerobic processes generate strong, unpleasant odors. Due to the slow process of digestion, there may be a rapid buildup of solids in the digestion ponds that must be removed and disposed of later. Further, anaerobic digestion does not remove salt content from runoff water.

Anaerobic systems are expensive to construct and may require a large capital investment to treat the effluent from a typical dairy or other farm operation. Often, covers are fitted to an anaerobic lagoon to capture and dispose of odorous gases such as $H_2S$ and ammonia. Such covers are expensive and require periodic maintenance.

It would therefore be valuable to provide a system and method for processing waste quickly and efficiently, with a minimum of odor and as completely as possible. Further, it would be valuable to be able to process solid waste quickly enough that solid waste does not build up. Further, it would be valuable to provide a system and method that minimizes both the capital and recurring costs.

SUMMARY OF THE INVENTION

The present invention overcomes the disadvantages and limitations of the prior art by providing an aeration system coupled with a specific regimen of microbes that efficiently and effectively break down solid and liquid waste. The aeration system may function by aerating the waste from the bottom using a laminar column of fine bubbles to most efficiently circulate the waste and to maximize the oxygen transfer. The aeration system may further comprise an ozone generator and/or an oxygen generator to increase the oxygen transfer to the liquid.

Additionally, circulators in a lagoon may further enhance the movement of the effluent in a horizontal fashion. Such circulation prevents solids from collecting in various areas of a lagoon and maximizes the decomposition of solid matter.

Specialized microbes are added to the water that efficiently and effectively decompose the waste matter, and remove targeted undesirable species such as nitrates or phosphates, as examples, depending on the microbes introduced. The microbes are a blend of aerobic and facultative anaerobic microbes. Additionally, a blend of enzymes is added that increase the digestion rates of the waste matter.

The present invention may therefore include a method for treating biological waste containing at least one target species for removal or conversion into another species, comprising: introducing the waste into a lagoon; adding to the lagoon at least one microbe effective for converting the at least one target species to at least one other species; and aerating the lagoon with a plurality of aerators located on the bottom of the lagoon, the aerators being adapted to produce a laminar column of bubbles.

The present invention may further include a method for treating biological waste containing at least one target species for removal or conversion into another species, comprising: introducing the waste into a first water filled lagoon; adding to the first water filled lagoon at least one microbe effective for converting the at least one target species in the waste to at least one other species; aerating the first water filled lagoon with a plurality of aerators dispersed on the bottom of the first water filled lagoon, the aerators being adapted to produce a laminar column of bubbles and being supplied by a first compressed air supply; circulating the first water filled lagoon with at least one circulator adapted to cause the first water filled lagoon to circulate; sending a portion of the water filled lagoon to a second water filled lagoon; aerating the second water filled lagoon with a plurality of aerators dispersed on the bottom of the second water filled lagoon, the aerators being supplied by a second compressed air supply; and circulating the second water filled lagoon with at least one circulator adapted to cause the second water filled lagoon to circulate.

Benefits and advantages of the present invention include, but are not limited to, that a substantially smaller amount of energy is required to decompose solid biological wastes than with existing systems, due to the laminar flow diffusers, the large degree of circulation, and the selection of specific microbes. Further, the present invention has the ability to completely decompose solid wastes to the point that solid waste build up in the lagoons is virtually eliminated. Any solids left in the effluent after processing are held in suspension and may deliver nutrients when used as fertilizer.

BRIEF DESCRIPTION OF THE DRAWINGS

The accompanying drawings, which are incorporated in and form a part of the specification, illustrate several embodiments of the present invention and, together with the description, serve to explain the principles of the invention. In the drawings.

DETAILED DESCRIPTION OF THE INVENTION

In what follows, the terms "biological waste," "waste stream," and "waste," as used herein, include domestic and industrial biological waste.

Figure 1:
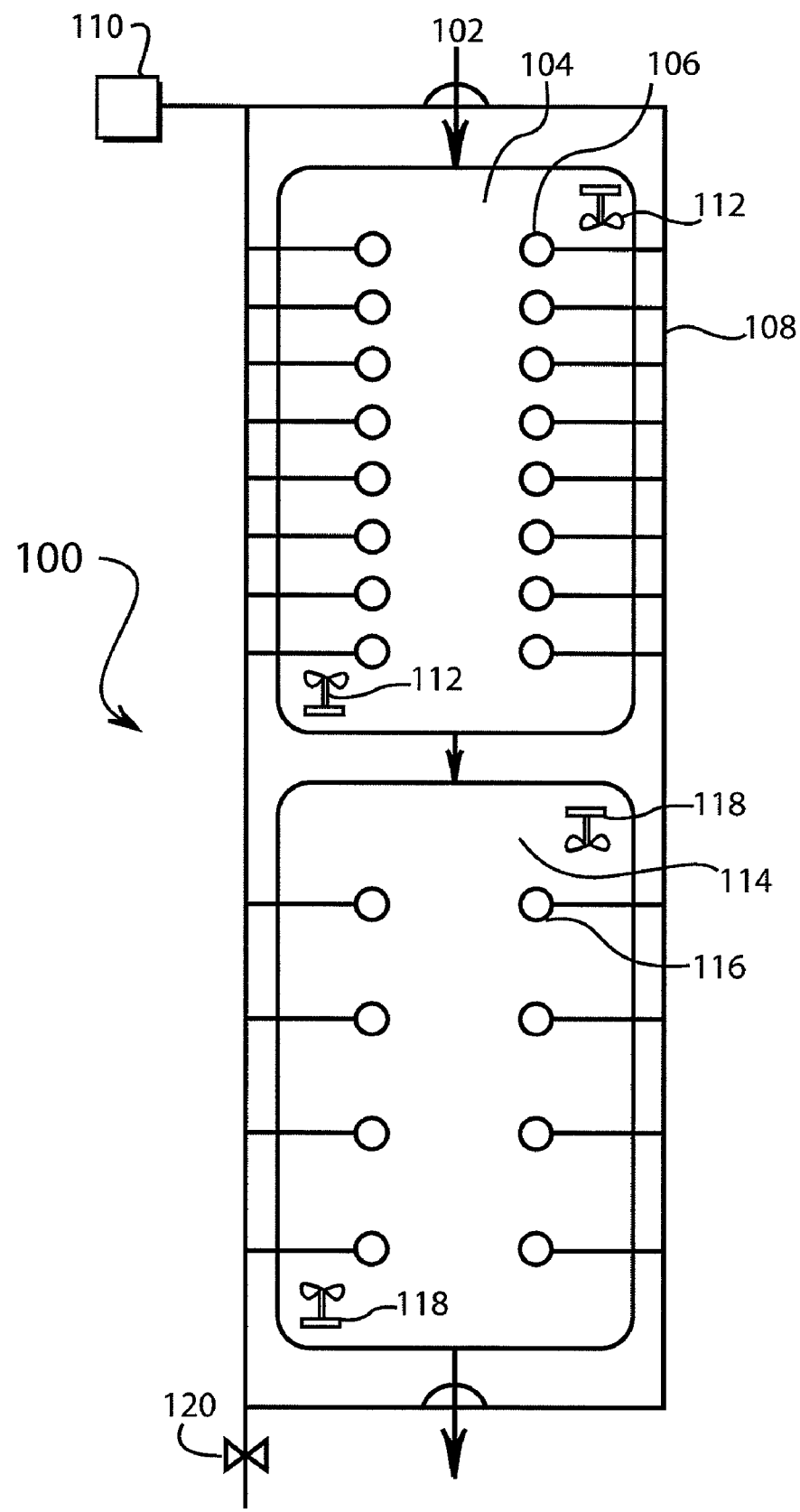
FIG. 1 is an illustration of an embodiment of the present invention comprising a two-lagoon digestion system.

Reference will now be made in detail to the present embodiments of the present invention, examples of which are illustrated in the accompanying drawings. Turning now to the drawings, FIG. 1 is an illustration of an embodiment 100 of the present invention comprising a two lagoon digestion system. Effluent is introduced by arrow 102 into primary lagoon 104. Primary lagoon 104 is outfitted with several air diffusers 106 that are fed by manifold 108 that is supplied by air supply 110. Primary lagoon 104 is further outfitted with surface circulators 112. Secondary lagoon 114 is fed by the overflow of primary lagoon 104, and has a set of air diffusers 116 connected to manifold 108. Secondary lagoon 114 is further outfitted with surface circulators 118. A blow off valve 120 is part of manifold 108.

The principle of operation of embodiment 100 is to introduce raw or filtered effluent, such as from a dairy, into a lagoon for digestion. The lagoon is inoculated with microbes and has a source of oxygen. Several bottom mounted fine bubble diffusers introduce oxygen into the lagoon. The diffusers serve an additional purpose of forced vertical circulation. Surface circulators force floating solids back into the lagoon for further digestion as well as circulate the lagoon in the horizontal plane. The diffusers are adapted to produce laminar columns of fine bubbles, which entrain large amounts of liquid and prevent build up of solid wastes in the lagoon. Further, the laminar columns of bubbles are the most efficient method of transferring oxygen into the liquid. Embodiment 100, through the high circulation and constant movement of the liquid, may fully digest solid waste introduced into the system.

In embodiment 100, the effluent is digested in two stages. The primary lagoon 104 performs much of the active digestion and decomposes much of the solid mass. The secondary lagoon 114 completes the digestion. The primary lagoon 104, due to the intensity of the digestion process at the early stages, may require much more aeration than secondary lagoon 114. By having multiple lagoons, the aeration requirements are less at each successive stage, thus requiring less energy for oxygenation. In general, the retention time of the primary lagoon 104 is in excess of 15 days.

In general, the lagoons are between 15 and 20 feet deep. For lagoons less than 15 feet deep, the oxygen transfer of the aerators begins to be substantially less efficient. For lagoons deeper than 20 feet, a regenerative type blower may not provide enough efficiency and a more expensive piston pump or other air pump may be needed.

The air system typically provides a minimum of 2.5 pounds of oxygen per pound of biological oxygen demand. The diffusers typically circulate up to 2,500 gallons per minute of water to the surface of the lagoons through the entrainment of water in the rising laminar bubble column. The airlift principle of the entrained water is the most efficient method of oxygen transfer as well as the main mechanism whereby solids are kept in suspension and anaerobic conditions are prohibited from forming. A typical system may have ozone enrichment at the rate of 12 grams to 20 grams per hour, with an airflow per diffuser of 1.5 to 2.5 cubic feet per minute.

Effluent may be introduced into the primary lagoon 104 in either the raw or filtered state. The raw state may include all solid waste plus hay, straw, and other material commonly used in cow stalls or other agriculture environment. The effluent generally contains urine plus water used in cleaning the stalls. The effluent may also contain additional material, such as twine, rope, and other material that may or may not be biodegradable.

The primary lagoon 104 and secondary lagoon 114 may be of any shape, including rectangular, square, circular, or other shape. The layout and placement of aerators 106 and circulators 112 are selected to minimize dead spots or areas where solid waste may not circulate well. The layout and arrangement of the primary lagoon 104 and the secondary lagoon 114 may be such that the secondary lagoon 114 may be located at a lower elevation than the primary lagoon 104, such that the output from the primary lagoon 104 may travel downhill to the secondary lagoon 114. In some embodiments, a pump may be used to transfer effluent from one lagoon to a second lagoon.

The diffusers 106 and 116 are connected to manifold 108. Manifold 108 in the present embodiment delivers air to all the diffusers in the system as supplied by air supply 110. In alternative embodiments, a plurality of air supplies 110 may feed several manifolds, such as a separate manifold for each lagoon, or one air supply and manifold for one side of a lagoon and a second air supply and manifold for the opposite side of the lagoon.

The surface circulators 112 and 118 serve to slowly circulate the lagoon in the horizontal direction and may act to reintroduce floating solid waste back into the liquid for further digestion. The circulators may be aerating surface circulators, paddlewheels, submerged propellers or any other device adapted to move water in a horizontal fashion. In some cases, such as the aerating surface circulators or paddlewheels, the circulators may help reintroduce floating debris and solid waste back into the lagoon for further digestion. When solid waste is floating on the surface of the lagoon, very little digestion is being accomplished since much of the surface area is not in contact with the liquid borne microbes. Further, the waste may undergo mechanical disintegration from the tumbling circulation of the aerated lagoon.

The air supply 110 may comprise a regenerative blower. In some embodiments, the air supply may be a multistage regenerative blower, a piston compressor, or other types of air compressors and/or blowers. Further, some embodiments may include an oxygen generator and/or an ozone generator as part of the air supply 110 modules. Oxygen and ozone generators may be used to increase the oxygen transferred to the liquid and thereby increasing the microbe activity. The air supply may be powered by electrical line from a power grid, a diesel engine, solar power, or other power sources. The air supply 110 may include a cooling system for cooling the air as it enters the manifold 108. Further, a cooling system may be employed to cool the compressors or blowers. A cooling system may use effluent from a lagoon as part of the heat transfer media. In some embodiments wherein several air supplies 110 are employed, an air supply for a first lagoon may include oxygen generators and/or ozone generators, and a second air supply for a second lagoon may not include the oxygen and/or ozone generators. Such embodiments may use an oxygen generator for a primary lagoon and no oxygen generator for a secondary lagoon.

The treated water that exits the secondary lagoon 114 may be used to irrigate fields. Due to the nature of the system, small particles may be in suspension in the outflow water. The salt content of the treated effluent may have 3.8 tons of salt removed per acre foot of water. The Total Kjeldahl Nitrogen (TKN) reduction may be on the order of 95%, where approximately 30% of all nitrogen in the processed water is in the form of protein and amino acids that can be utilized by soil organisms and plant material when used for irrigation. Because the biological oxygen demand of the treated water is significantly reduced, soils irrigated with the treated effluent may remain aerobic while still providing a more usable form of organic matter that includes both complex and simple sugars. Virtually all nitrates are removed from the treated water by the process. Weed seeds, which can cause problems for farming operations, are digested by the process and are not found in the treated water.

Figure 2:
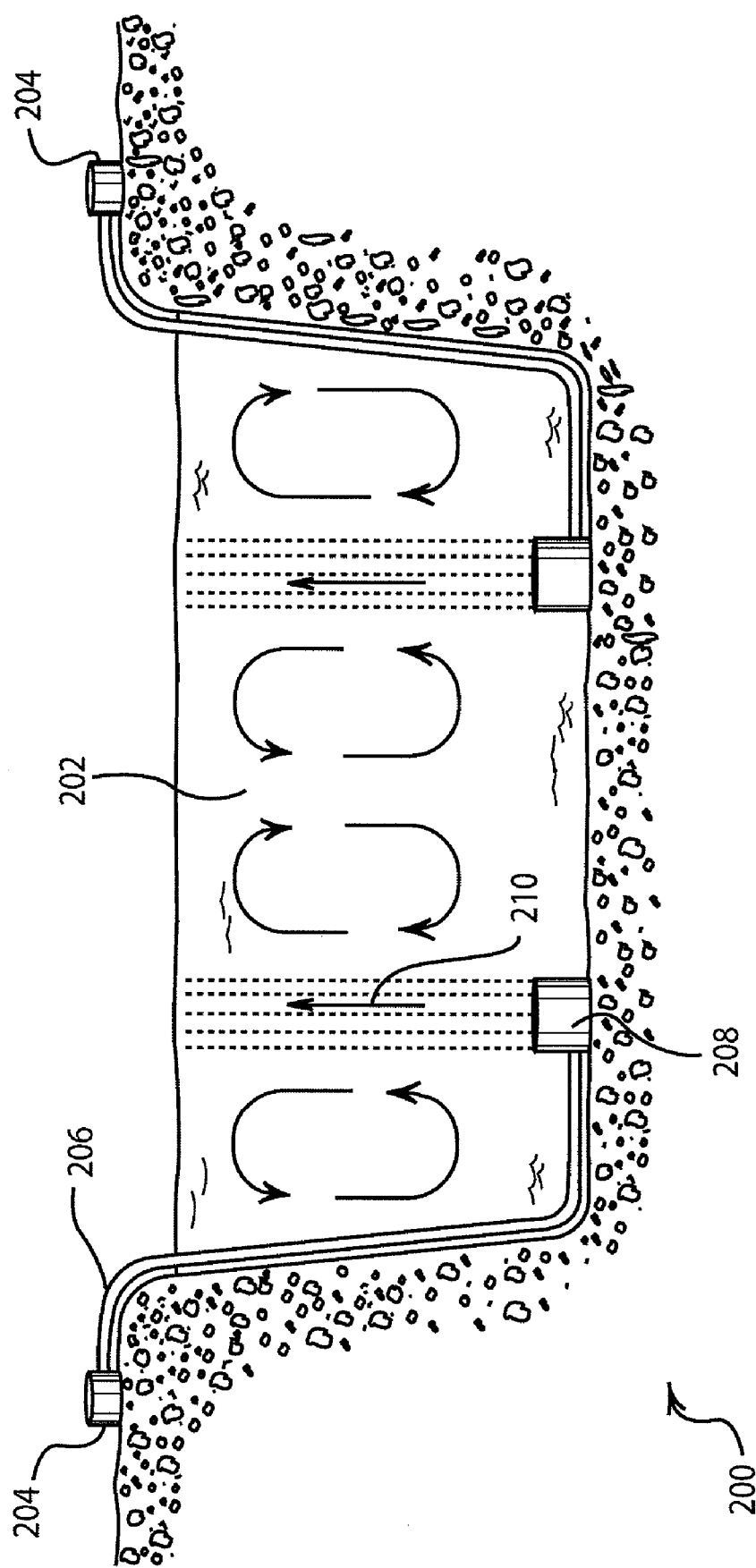
FIG. 2 is an illustration a cross-section of a typical lagoon of the embodiment of the present invention of FIG. 1.
Figure 3:
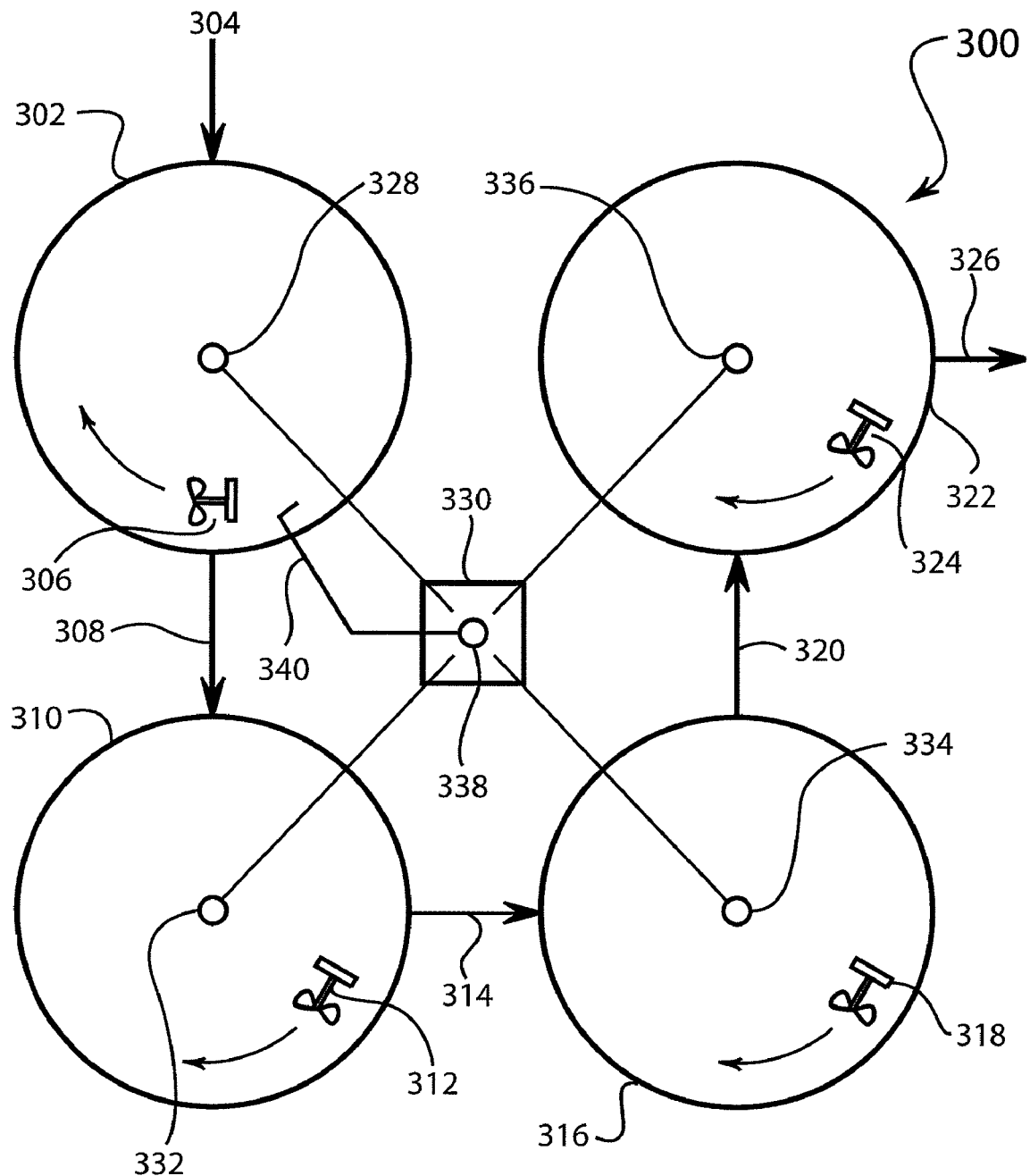
FIG. 3 is an illustration of a top view of an embodiment of the present invention wherein four circular lagoons are used in series to treat effluent.

FIG. 2 is an illustration an embodiment 200 of a cross-section of a typical lagoon 202. A manifold 204 is connected to a pipe 206 that is in communication with a diffuser 208. The bottom-mounted diffuser 208 is adapted to produce a laminar column of fine bubbles 210.

The lagoon 202 may be approximately 10 to 20 feet deep and may have a clay bottom or other construction to prevent leakage. In some cases, the lagoon 202 may have a plastic or rubber liner to prevent leaking. The lagoon may be 50-300 feet wide, depending on the application. Other sizes of lagoons may be used without deviating from the spirit of the present invention.

The manifold 204 may be mounted above ground as in FIG. 2, or may be mounted below ground. The manifold may be constructed of PVC piping, steel piping, or any other type of pipe as desired. In some cases, the compressed air is very hot and causes problems with the manifold piping.

The pipe 206 is preferably self weighted tubing, with a density substantially higher than water, such that the tubing may lay on the bottom surface of the lagoon. In some embodiments, the pipe 206 may be rigid or semi-rigid tubing and may need to be weighted down with bricks or other objects to prevent the pipe 206 from moving when inflated. Pipe 206 may include a flow control or meter so that the individual diffusers may be adjusted to deliver a laminar column of bubbles.

The diffuser 208 may be mounted on the bottom of the lagoon 202, which has several advantages. For example, the further the bubbles have to travel, the more time the oxygen has to transfer from the bubble to the effluent. Further, the rising column of bubbles is a very efficient method of inducing circulation, and the bottom mounting ensures that the dead space where water does not circulate is minimized.

The diffuser 208 may be a large (6 to 12 inch) expanding membrane fine bubble diffuser. The size of the diffuser 208 may be determined by the application. For example, for a shallower lagoon, a smaller diffuser may be used. A smaller diffuser may be used in larger lagoons where the diffusers are placed closer together. In some cases, a smaller diffuser may be used in the middle of the lagoon and a large diffuser may be used in the corner of a lagoon. In some embodiments, an adjustable flow control may be used to individually control the amount of air flowing to a particular diffuser. A flow control may be adjusted to decrease flow on a diffuser that is generating turbulent or slug flow. A flow control may be adjusted to increase flow to a diffuser where solid waste is building up near the diffuser. In some embodiments, the oxygen requirements for a secondary lagoon may be smaller than that of a primary lagoon, therefore the diffusers in the secondary lagoon may be restricted to deliver less air than the diffusers of the primary lagoon. In some embodiments, the pipe 206 and the diffuser 208 may be buried in the lagoon bottom.

The circulation patterns produced by the diffusers are such that strong vertical currents may be produced in the lagoon especially as the result of the laminar flow of bubbles produced by the diffusers that increase such vertical circulation substantially. The strength of the currents keeps solid wastes moving and constantly being decomposed. Sufficient strength of the currents keeps the wastes in suspension so that the microbes present in the effluent may effectively and completely decompose and disintegrate the solid matter.

Maintaining a healthy environment in the pond or waste by decomposing wastes and reducing the impact of toxic compounds like ammonia, phosphates, hydrogen sulphide are also goals of the waste treatment system with the above microbial species.

Microbes or combinations of microbes are selected for their ability to convert at least one undesirable species (target species) into at least one other species, generally less toxic or at least easier to remove if required, as well as for their ability to degrade the waste itself, and may include: *Bacillus amyloliquefaciens* (ATCC# 23842), *Bacillus brevis* (ATCC# 8185), *Bacillus cereus* (EHC100 strain), *Bacillus circulans* (ATCC# 14176), *Bacillus cougulans* (ATCC# 10545), *Bacillus firmus* (ATCC# 8247), *Bacillus halodenitrificans* (ATCC# 49067), *Bacillus laterosprorus* (ATCC# 31932), *Bacillus licheniformis* (ATCC# 12759), *Bacillus megaterium* (ATCC# 21181), *Bacillus myocoides* (ATCC# 21929), *Bacillus pasteurii* (ATCC# 11859), *Bacillus polymyxa* (ATCC# 21551; useful for pectin removal.), *Bacillus subtilis* (ATCC# 21697), *Nitrobacter* sp. (ATCC# 25381), *Nitrosomonas europea* (ATCC# 19718), *Pseudomonas putida* (ATCC# 12633), *Rhodobacter sulfidophilus* (strain PS9), *Saccharomyces, Streptomyces badius* (ATCC# 252), *Thiobacillus* (ATCC# 25259 and #23270), and mixtures thereof in various combinations.

Bacteria species are purchased from the American Type Culture Collection (ATCC). A single species of bacterium, for example, a *Bacillus*, is placed in a starter culture liquid medium, mass produced in a high volume aerobic tank at between 86° F. and 92° F. to provide exponential growth and mass conversion to *Bacillus* endospores when the medium is exhausted. The mass culture medium is a standard preparation for culturing *Bacillus* species of microbes and is commercially available in the form of Maltodextrin (derived from corn syrup, and a source of readily digested carbohydrates). In addition, diatomaceous earth may be added as a carrier for the microbes where they may grow and multiply. Bacteria are collected in settling tanks or by centrifugation. The concentrated product is spray dried for each species. Species are then blended at concentrations between 50 billion and 100 billion CFU/ml. The blended or individual bacteria species are blended with a carbon/nutrient source such as food grade corn meal to a final concentration of bacterial species of between 2 billion and 4 billion CFU/ml, and packed in watertight containers. The bacteria may then be used for biological waste treatment. Degradative enzymes produced by the various bacteria species set forth hereinabove are useful for reducing organic wastes.

As best understood by the present inventor, but not intended to limit the invention, the microbes identified hereinabove perform the following functions:

(a) *Bacillus amyloliquefaciens* degrades proteins extracellularly as well as starch and cellulose materials, and may be used for degrading straw in waste streams.

(b) Some of *Bacillus azotoformans, Bacillus cereus, Bacillus laterosporus, Bacillus licheniformis, Bacillus pasteurii*, and *Bacillus stearothermophilus* reduce $NO_3$ to $NO_2$, while they all participate in denitrification (conversion of $NO_3$ fertilizers to volatile $NH_3$, $N_2O$ or $N_2$).

(c) *Bacillus brevis*, a probiotic, generates an antibiotic peptide useful for destroying *E. coli* bacteria and other pathogenic species that may inhibit the growth of the beneficial species.

(d) *Bacillus cereus, Bacillus laterosporus* and *Bacillus pumilus*, like *Bacillus brevis*, also generate beneficial antibiotics which reduce *E. coli* and other Gram negative microbe concentrations.

(e) *Bacillus circulans, Bacillus megaterium, Bacillus firmus* and *Bacillus subtilis* are effective for degrading most substrates derived from plant and animal sources, including cellulose, starch and other polysaccharides, pectin, proteins, agar, hydrocarbons, fats and oils, as examples; these species also produce antibiotics, and are useful for nitrification and denitrification. *Bacillus megaterium* also removes phosphorus. *Bacillus subtilis* is useful for nitrate removal.

(f) *Bacillus halodenitrificans* is a salt tolerant denitrifier, effective for reducing nitrate to nitrogen, and also reducing nitrites.

(g) *Bacillus licheniformis* contributes to nutrient cycling and displays antifungal activity; proteins, starch and keratin are also removed by this bacterium.

(h) *Bacillus pasteurii* converts urea to ammonium carbonate, and is capable of taking up ammonia in alkaline and salty conditions.

(i) *Bacillus polymyxa* provides nitrification in waste streams where low oxygen conditions may exist, and is effective for pectin removal.

(j) *Bacillus thuringiensis* is used for its ability to limit *E. coli* formation in wastewater, as well as other undesirable bacteria such as *Pseudomonas*. It also finds use as a natural insecticide for control of fly and mosquito larvae.

(k) Nitrobacter and Nitrosomas are nitrogen fixers; Nitrosomas converts ammonia to nitrite, while *Nitrobacter* converts nitrite to nitrate.

(l) *Pseudomonas putida* is effective for ammonia uptake and is useful in hydrocarbon degradation; it is also capable of remediating certain toxic organic pollutants.

(m) *Rodobacter sulfidophilus* us a photoorganic microbe that can operate in anaerobic conditions for reducing emission from volatile organic compounds (VOC) from waste lagoons, and for reducing hydrogen sulfide therein.

(n) *Streptomyces badius* may be used for degradation of cellulose by extraction of carbon from cellulose or lignin compounds found in straw and paper waste.

(o) *Saccharomyces* (*Saccharomyces cerevisiae*), commonly known as "bakers' yeast," and commercially available as yeast, consumes phosphorus compounds. Additionally, it ferments sugars present in the waste, thereby generating carbon dioxide and alcohol. The sugar products provide food for other beneficial microbe species, thereby allowing them to increase in numbers.

(p) *Thiobacillus* is capable of digesting inorganic sulfur compounds as well as hydrogen sulfide, thereby reducing offensive odors. It is a chemoautotrophic species capable of reducing heavy metals as well.

Enzymes may be added or produced when the bacteria are introduced into the aqueous environment. The most effective combination of microbes may be selected based upon the characteristics of the biological waste. Introduction of a properly chosen microbe species or a mixture of microbe species to the waste may result in bacterial conversion of nitrogen and solid organic wastes, salt uptake, and reduction of BOD, total suspended solids (TSS) and VOC, as examples, depending on the nature of the waste. Waste organic solids are reduced to simpler organic compounds. Ammonia may be reduced to nitrates, or directly converted to nitrogen gas, whereas other wastes are converted to carbon dioxide, oxygen, simple sugars, and bacterial proteins, as examples.

As examples, in the lagoon a formulation of the microbes *Bacillus subtilis* (useful for nitrate, starch and protein removal) and *Bacillus licheniformis* (useful for protein, starch and keratin removal) might be about 65% *Bacillus subtilis,* 25% *Bacillus licheniformis*, and the balance an enzyme formulation of alpha-amylase of 1-3%, beta-gluconase of 1-3%, protease of 1-3%, lipase of 1-3%, esterase of 1-3%, hemi-cellulase of 5%, wheat bran at 12 ounces per pound, sodium chloride at 1 to 2% as a preservative. The formulation may be inoculated into the lagoons at strength of between 2 and 4 billion CFU/gram of material and in the amounts of 5 to 10 lbs per surface acre. The frequency of inoculation may be approximately biweekly. The amounts of each inoculant may be varied based on the conditions of the digestion system. Such a formulation would be useful for removing protein, starch, keratin and nitrates from a waste. Clearly, FIG. 3 is an illustration of a top view of an embodiment 300 of the present invention wherein four lagoons are used in series to treat effluent. The effluent is introduced into the primary lagoon 302 through the inlet 304. A circulator 306 provides horizontal circulation for primary lagoon 302. The outlet 308 connects primary lagoon 302 to secondary lagoon 310. A circulator 312 provides horizontal circulation for secondary lagoon 312. The outlet 314 connects secondary lagoon 310 to tertiary lagoon 316. A circulator 318 provides horizontal circulation of tertiary lagoon 316. The outlet 320 connects tertiary lagoon 316 to final lagoon 322. A circulator 324 provides horizontal circulation of final lagoon 322. The product water exits the system through outlet 326.

Primary lagoon 302 has a drain 328 that is connected to sludge pit 330. Secondary lagoon 310 has a drain 332 connected to sludge pit 330. Tertiary lagoon 316 has a drain 334 connected to sludge pit 330, and final lagoon 322 has a drain 336 connected to sludge pit 330. Sludge pit 330 has a drain 338 and a return system 340 to pump sludge into primary lagoon 302.

The embodiment 300 is a four lagoon embodiment wherein each circular lagoon is highly aerated and constantly circulated to efficiently and effectively digest raw and filtered effluent waste. Each lagoon may be outfitted with a plurality of bottom mounted fine bubble aerators and inoculated with a special blend of microbes. The aeration system of a typical lagoon will be described hereinafter and may provide a vertical circulation and constant motion of the effluent. The drain system in the center of each lagoon may provide a mechanism whereby any solids present in a lagoon may be drained into sludge pit 338 and pumped back into primary lagoon 302. In this manner, the solids may be recycled through the embodiment 300 to completely digest the solids.

Lagoons 302, 310, 316, and 322 may be approximately 245 feet in diameter for a system designed to handle the daily raw waste of a dairy of about 4000 head of cattle. Approximately 75 tons of raw waste may be introduced into inlet 304 per day. The present invention may also be adapted to be used for chicken waste, pig waste, human waste, and other biological wastes.

The circulators 306, 312, 318, and 324 may be surface mounted aspirating circulators, surface mounted paddle wheel circulators, subsurface circulators, or any other type of device adapted to move the effluent in a horizontal fashion.

Figure 4:
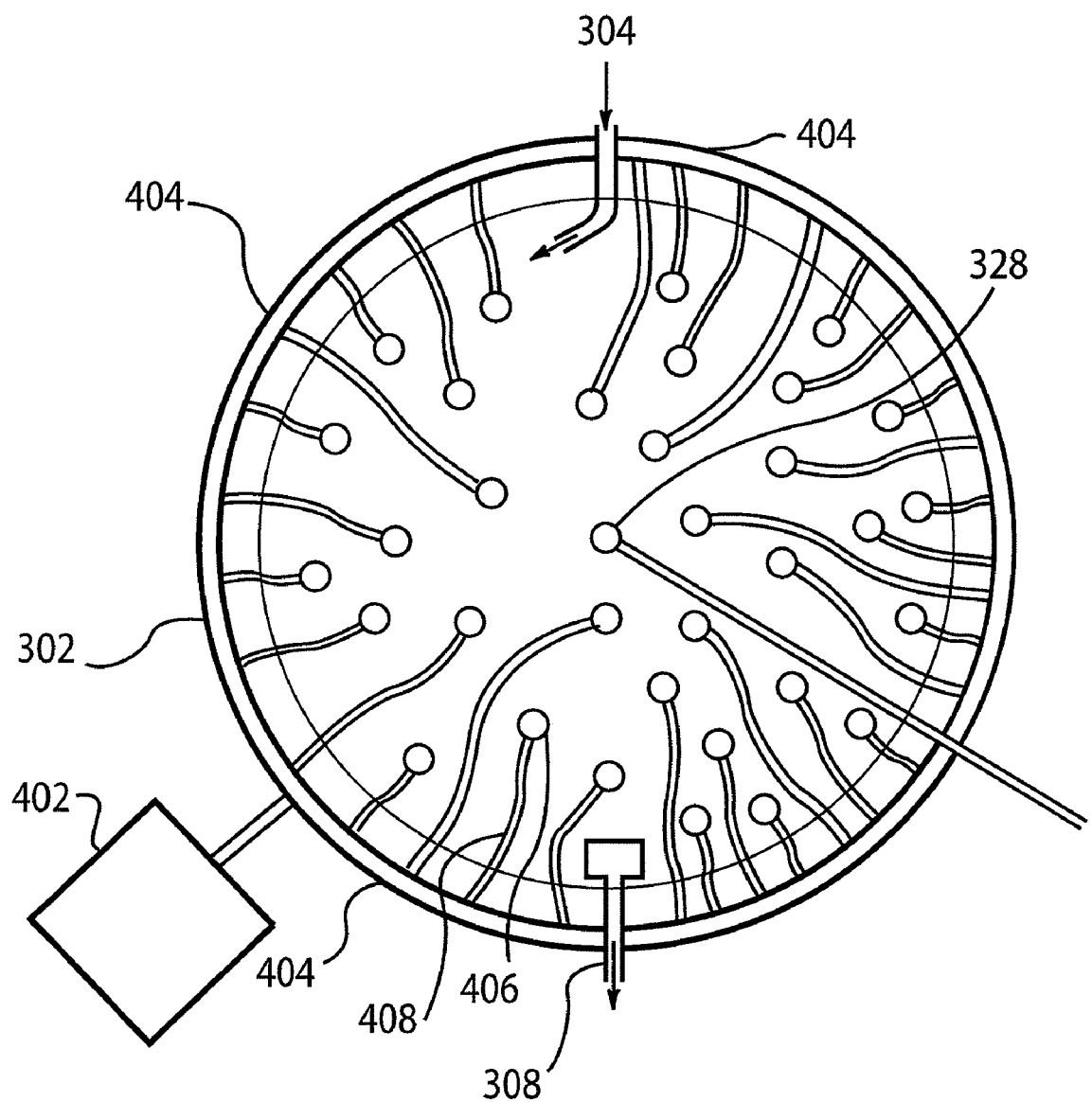
FIG. 4 is an illustration of a top view of lagoon of the embodiment of the present invention of FIG. 3 showing the aeration system.

FIG. 4 is an illustration of a top view of lagoon 302 showing the aeration system in lagoon 302. The inlet 304 and outlet 308 are shown in the present figure. Drain 328 is also shown in the present figure. An air source 402 is connected to an air manifold 404 that encircles the lagoon 302. A diffuser 406 is connected to manifold 404 through a self-weighted pipe 408. Several diffusers are located throughout the lagoon 302 and are all in communication with the manifold 404.

The air source 402 may contain a high volume, low pressure air source. In some cases, a regenerative blower or other type of compressor may be used and may provide up to 10 psi pressure and 1.5 to 2.5 cubic feet per minute per diffuser. The air source 402 may have an additional oxygen generator and/or an ozone generator to enhance the oxygenation of the effluent. The air source 402 may include a cooling system for cooling the air produced by the air source. Such a cooling system may use effluent as a cooling medium. The manifold 404 may be buried around the edge of lagoon 302 or may be mounted above ground. The manifold 404 may be on the order of 4 inches in diameter. The air source 402 may supply air to all four lagoons 302, 310, 316, and 322 simultaneously. The air source 402 may be designed to run continuously.

Each lagoon 302, 310, 316 and 322 may be outfitted with a similar aeration system as in the present figure. However, secondary lagoon 310 may require fewer diffusers than primary lagoon 302, tertiary lagoon 316 may require fewer diffusers than secondary lagoon 310, and final lagoon 322 may require fewer diffusers than tertiary lagoon 316. As the effluent is treated in each subsequent lagoon, the oxygen requirements are less and therefore fewer diffusers may be required.

Figure 5:
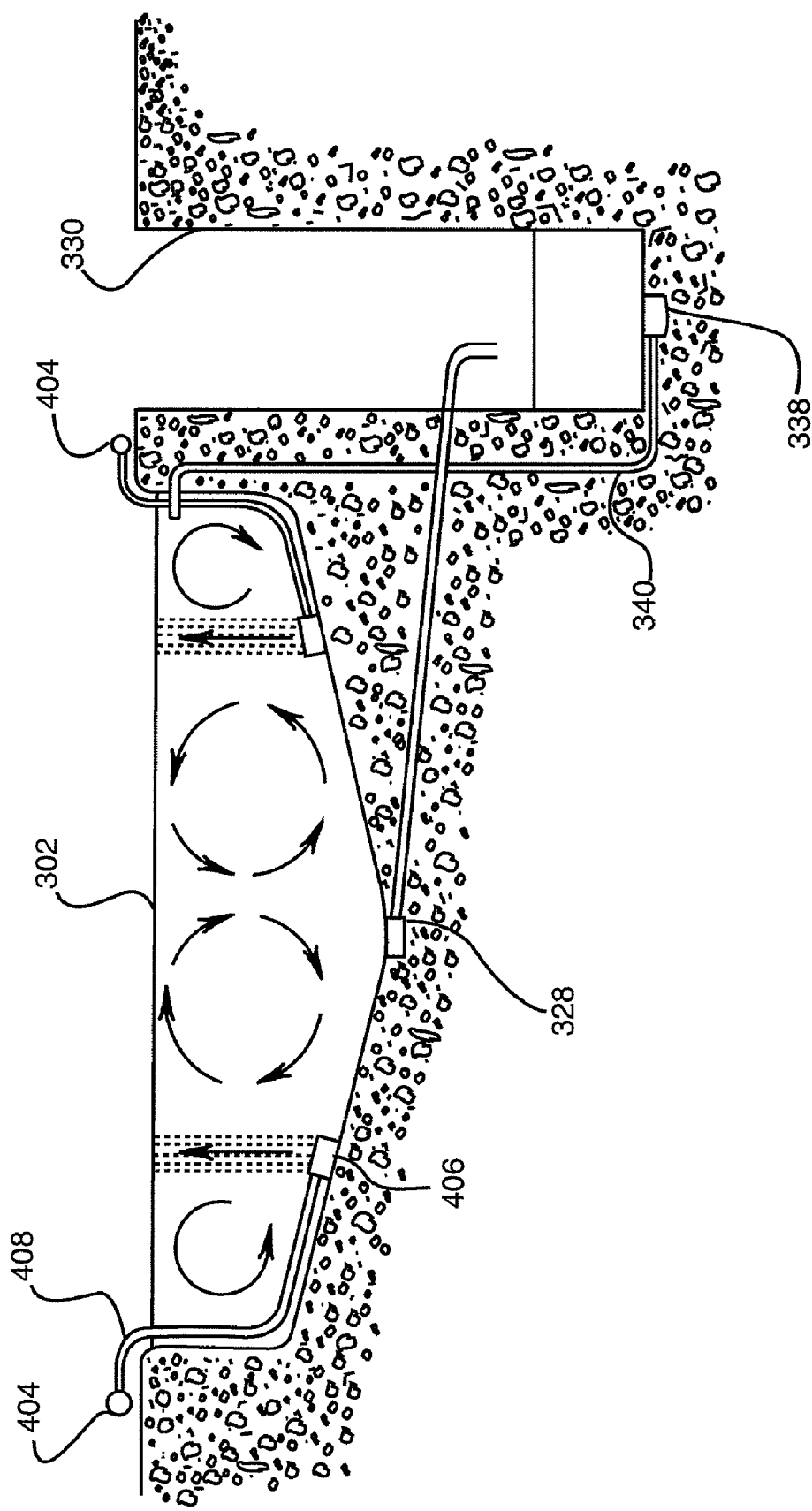
FIG. 5 is an illustration of a section view of a lagoon of the embodiment of the present invention of FIG. 3.

FIG. 5 illustrates a section view of lagoon 302 and sludge pit 330. The center drain 328 leads into sludge pit 330, where a pump may be mounted in drain 338 and recycle sludge through the pipe 340. The air manifold 404 is in communication with diffuser 406 through pipe 408.

The sludge pit 330 may be fed with the sludge from all four lagoons 302, 310, 316, and 324. Valves not shown on each drain system may allow an operator to control the flow of the sludge to the sludge pit. Such valves may be manually or automatically actuated.

The diffuser 406 may be a fine bubble diffuser adapted to form a laminar column of air bubbles. Laminar bubble columns have been found to be the most efficient method for entraining water and forcing circulation. Because of the location of the diffuser 406 on the bottom of the lagoon, the maximum amount of circulation may be achieved. The circulation is important in the effectiveness of the present system, since the constant motion of solid wastes prohibits the wastes from collecting and building up in the lagoons. Further, the longest duration of contact is achieved between the air introduced by the diffuser 406 and the effluent in the lagoon. Additionally, since the laminar flow is slower than slug flow or turbulent flow, more time is allowed for the contact of the bubbles with the liquid.

Figure 6:
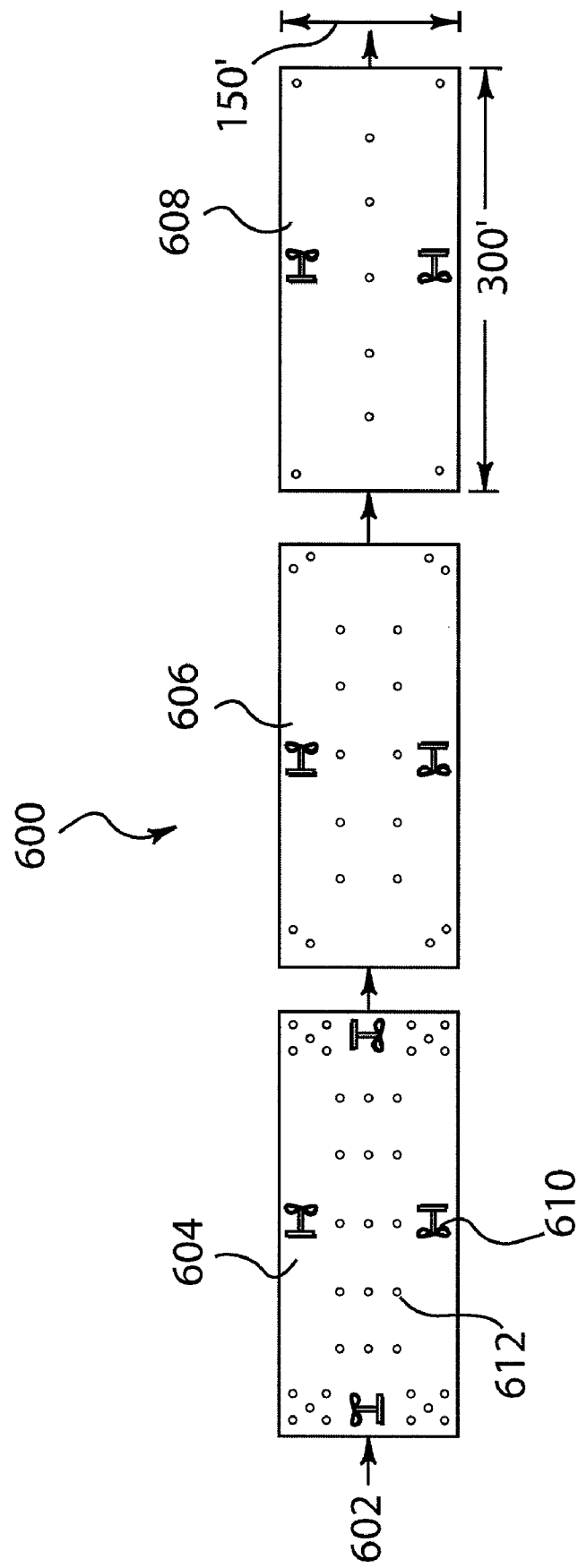
FIG. 6 is an illustration of an embodiment of the present invention comprising three lagoons.

FIG. 6 illustrates an embodiment 600 of the present invention comprising three lagoons of the approximate size of 300 by 150 feet. The lagoons are approximately 15 feet deep. Effluent enters by arrow 602 into the primary lagoon 604, which feeds secondary lagoon 606, which feeds tertiary lagoon 608. The arrangement of surface circulators 610 and diffusers 612 is shown in the figure.

Embodiment 600 is designed to handle approximately 75 tons of unfiltered effluent per day. The lagoons are designed to process waste in a progressive fashion, with a majority of digestion taking place in the primary lagoon 604, and less digestion taking place in each successive lagoon.

Primary lagoon 604 is outfitted with four surface circulators 610 and 35 diffusers 612. Several of the diffusers are located in the corners of the lagoon to force circulation in the corners and prevent the stagnation and buildup of solid wastes. The surface circulators 610 are arranged to keep the horizontal circulation progressing throughout the lagoon 604.

Secondary lagoon 606 requires less oxygenation and less circulation since most of the solid waste is decomposed in primary lagoon 604. Therefore, only two surface circulators 610 and 18 diffusers 612 are required.

Tertiary lagoon 608 requires still less oxygenation than secondary lagoon. Therefore, only two surface circulators 610 and 9 diffusers 612 are required.

Figure 7:
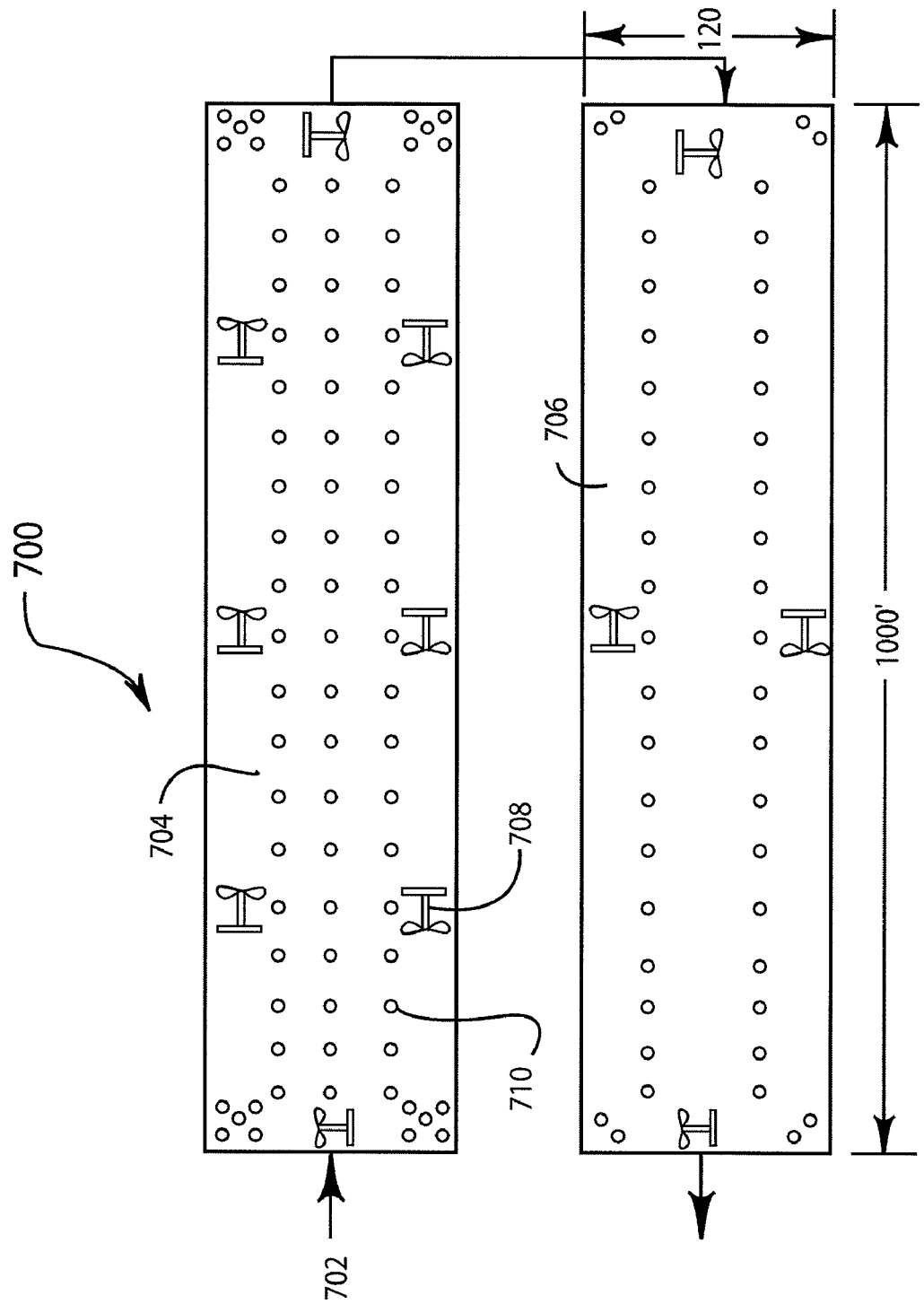
FIG. 7 is an illustration of an embodiment of the present invention comprising two long, narrow lagoons.

FIG. 7 illustrates an embodiment 700 of the present invention comprising two long, narrow lagoons of the approximate size 1000 by 120 feet. Effluent is introduced at arrow 702, is processed by primary lagoon 704 and completed in secondary lagoon 706.

Embodiment 700 may handle approximately 75 tons of unfiltered raw waste per day. The depth of the lagoons is about 15 feet. The lagoons may be oriented so that the flow of effluent is downhill from the primary lagoon 704 to the secondary lagoon 706.

Primary lagoon 704 is outfitted with eight surface circulators 708 and 74 diffusers 710. Secondary lagoon 706 is outfitted with four surface circulators 708 and 46 diffusers 710.

Having generally described the present invention, more details thereof are presented in the following EXAMPLES.

EXAMPLE 1

Experimental Results September 2001:

Experiments have been conducted using the inventive waste stream digestion system during September 2001 at California Dairies, Inc., of Tipton, Calif.

The results below were for a 1.43 acre secondary pond receiving approximately 410,000 gallons of influent from a primary digestion pond. The secondary pond had been outfitted with 74 Duraplate diffusers from Keeton Industries. The air supply was a 20 HP two stage regenerative blower producing air at a pressure of 240 inches of water. An ozone generation system producing 10 to 12 grams per hour of ozone was used downstream of the air source. The pond was approximately 10 feet deep.

The biological oxygen demand (BOD) of the influent was 3841 lbs per day. The transfer rate of oxygen was calculated at 5761 lbs of oxygen per day.

The results show that the above system has a transfer rate of 12.2 lbs of oxygen per horsepower per hour. This compares to traditional paddlewheel aeration where the maximum transfer rate is approximately 1.5 lbs of oxygen per horsepower per hour.

EXAMPLE 2

Experimental Results January 2001:

The January 2001 results of the Water Pure aerobic bioremediation of dairy waste include the analysis of three dairies, one with a solid separator. The analysis of all three dairy pond systems includes the determination of the Biological Oxygen Demand (BOD), a measure of the organic matter in solution, and the Total Kjeldahl Nitrogen (TKN) for each sample taken. The results of these analyses have allowed the inventive method of bioremediation to be more easily explained and verified.

Figure 8:
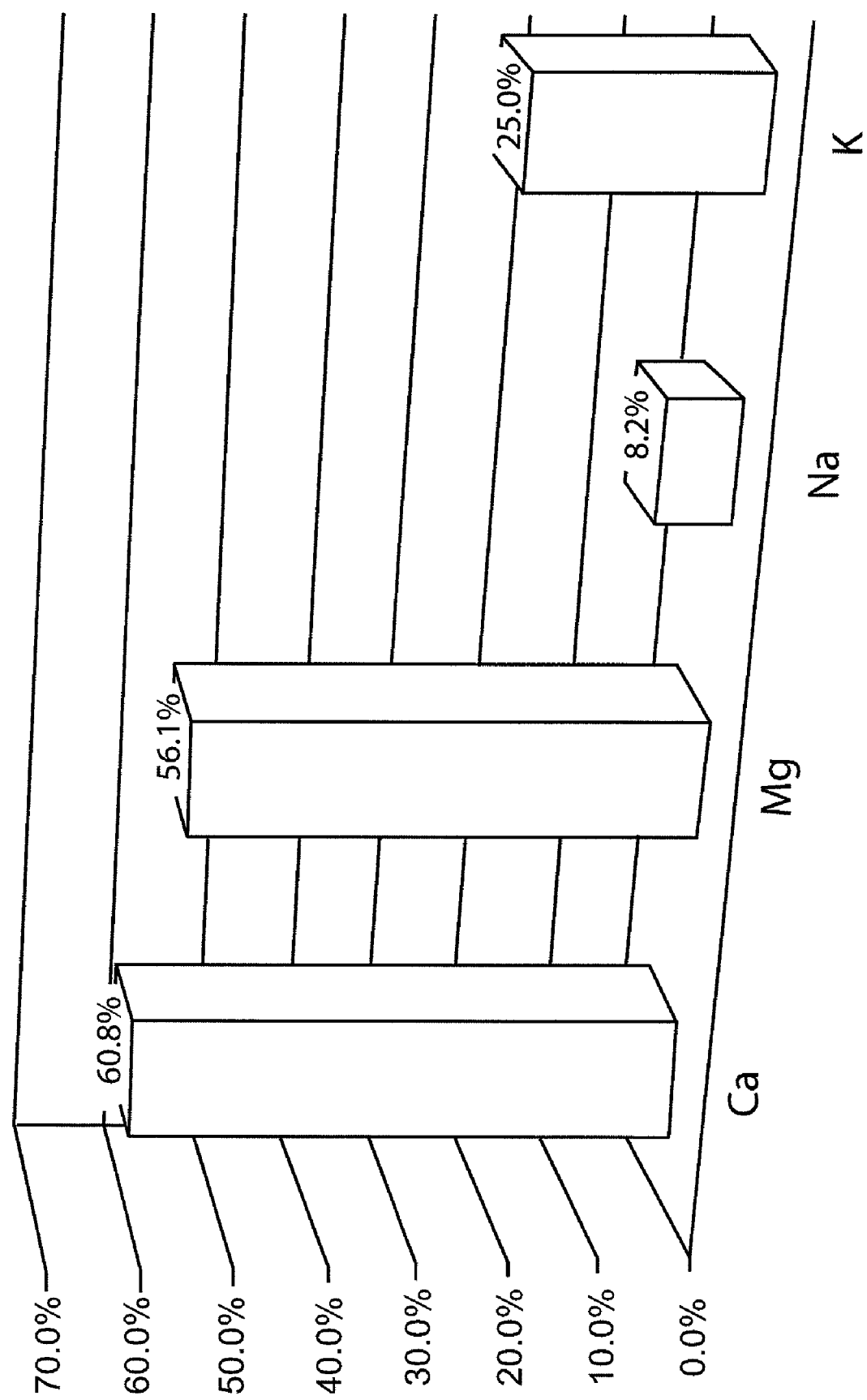
FIG. 8 illustrates the cation decrease with an embodiment of the inventive waste processing system.

It is determined that the decrease in the Electrical Conductivity of the water (ECw) was mainly because of the calcium ion and magnesium ion forming precipitates as carbonates and phosphates. It is assumed that the decrease in the sodium and potassium ion was associated with the incorporation of these more soluble ions into the bodies of the organisms involved in the digestion of the organic matter in the waste. Another observed decrease in cation concentration is associated with the ammonium ion eliminated by the denitrification, reduction to nitrogen gas, $N_2$ discussed later. FIG. 8 illustrates the cation decrease with three experimental embodiments of the inventive waste processing system.

Figure 9:
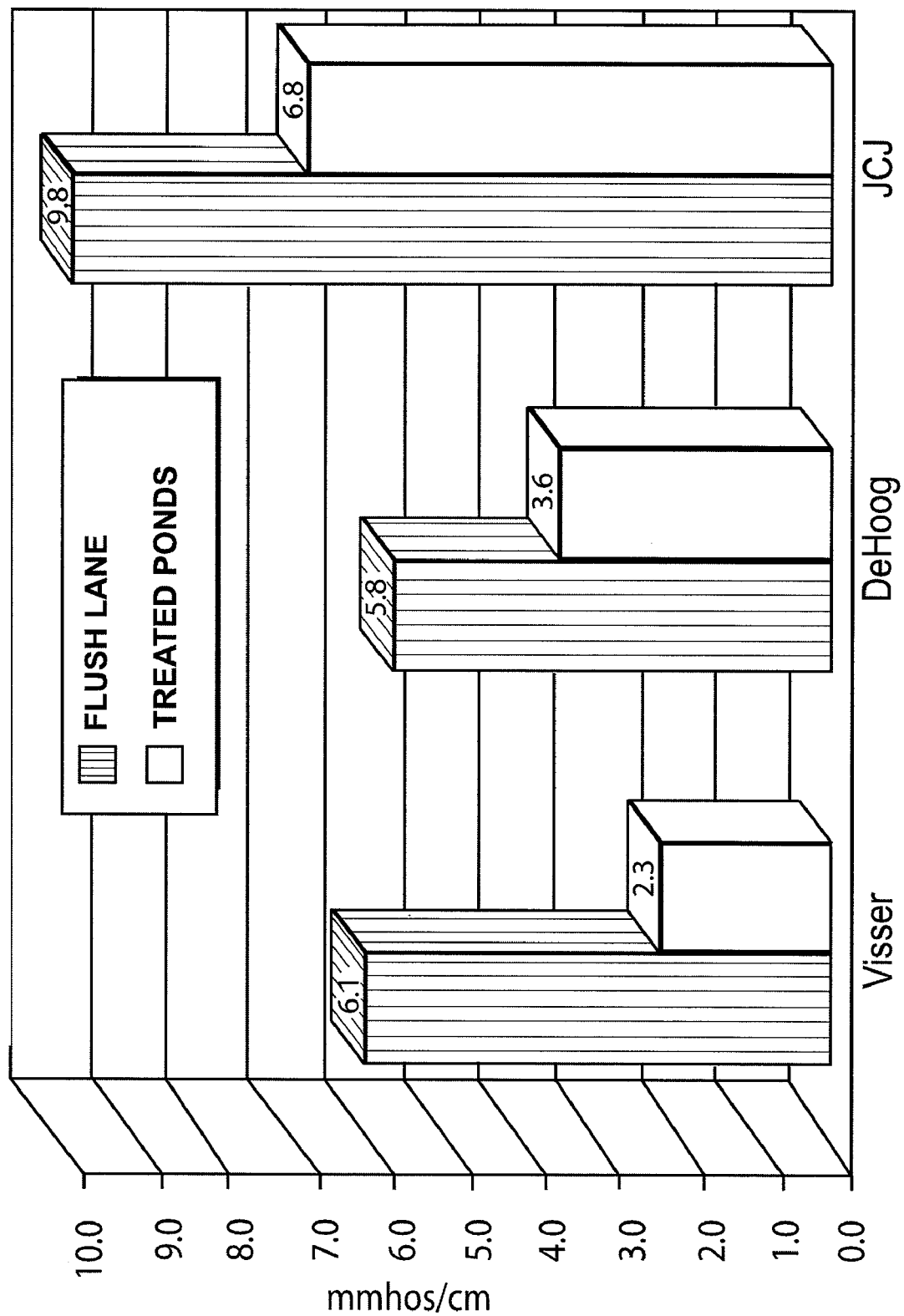
FIG. 9 illustrates the decrease in electrical conductivity of the water with three experimental embodiments of the present invention.
Figure 10:
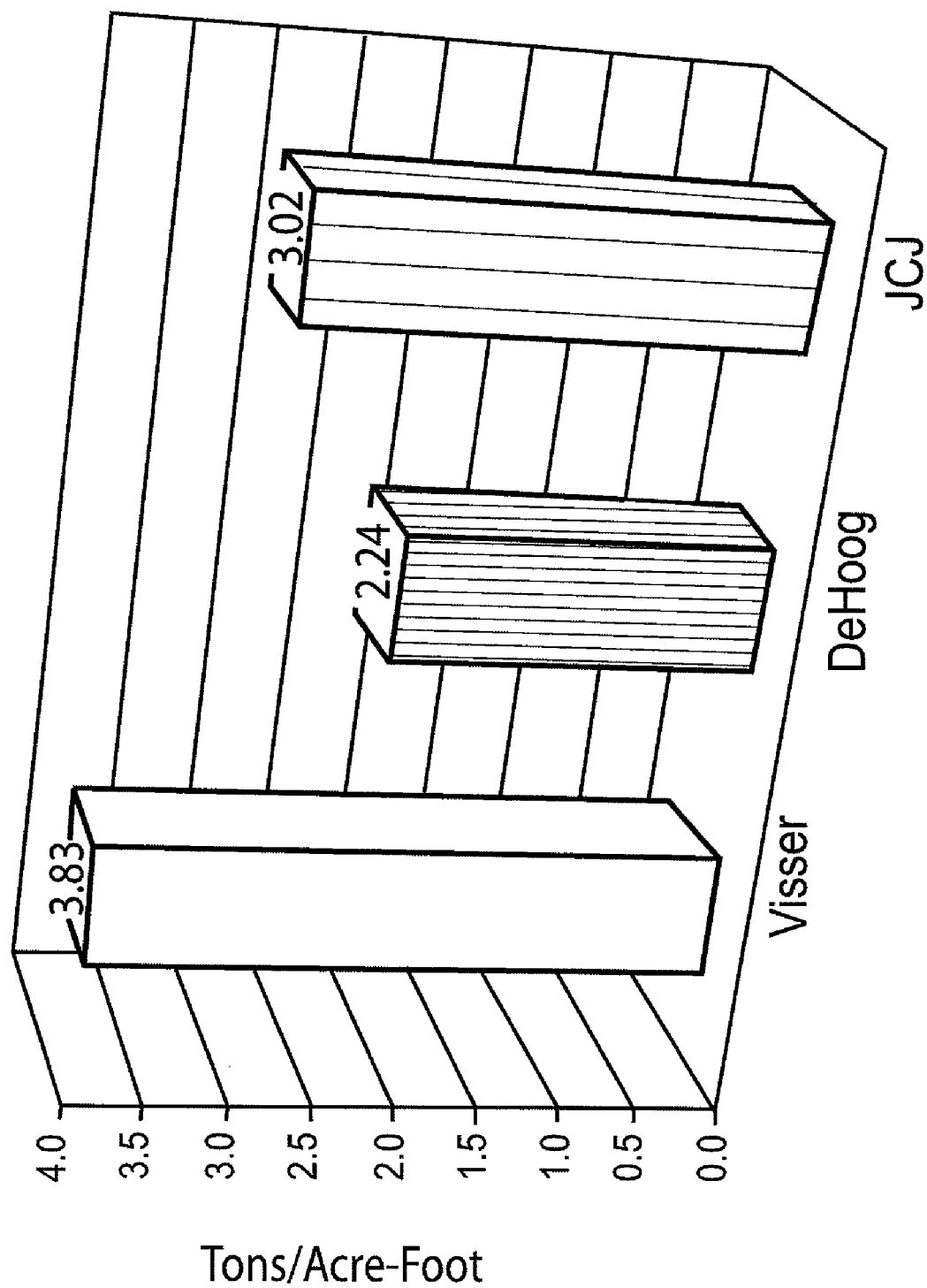
FIG. 10 illustrates the tons of salt removed per acre-foot with three experimental embodiments of the present invention.

The average decrease in the ECw is 44% corresponds to an average reduction of the over-all salt by 3.4 tons of salt per acre-foot of the digested product water. The restrictions placed on the number of dairy animals based on the salt output from each animal may be able to be reevaluated. This method of bioremediation if applied to dairy waste streams may provide a way to decrease groundwater contamination. The lower the ECw of the product water, the safer the product water becomes as an irrigation source. The agricultural operations at or near the dairies utilizing the inventive waste stream digestion system for aerobic digestion may be able to more safely continue the long-term use of this water while minimizing salt and extra nutrient in the irrigation water. FIG. 9 illustrates the decrease in ECw with three experimental embodiments of the present invention while FIG. 10 illustrates the tons of salt removed per acre-foot with the same experimental embodiments of the present invention.

Because of the control and monitoring of the product water nutrient output, which is part of the bioremediation program, nutrient contamination of ground water may be minimized. Because the overall nutrient load in the product water will be known, the farming operations may be able to eliminate unnecessary applications of other fertilizers. This can provide a cost savings in nutrients as well as a savings in the labor associated with the application of these nutrients. As the regulatory agencies require more control and documentation of all nutrients applied to farming operations, the utility of the use of this type of product water sources may become even more valuable. The utility has been proven so far in silage grown on fields using the product water, which has undetectable nitrate concentrations. The corn silage grown with this water has provided 30% higher tonnage of silage and 40% higher protein content. The uptake of the nitrogen of all sources as well as the uptake of micronutrients such as zinc and manganese has been observed.

Figure 11:
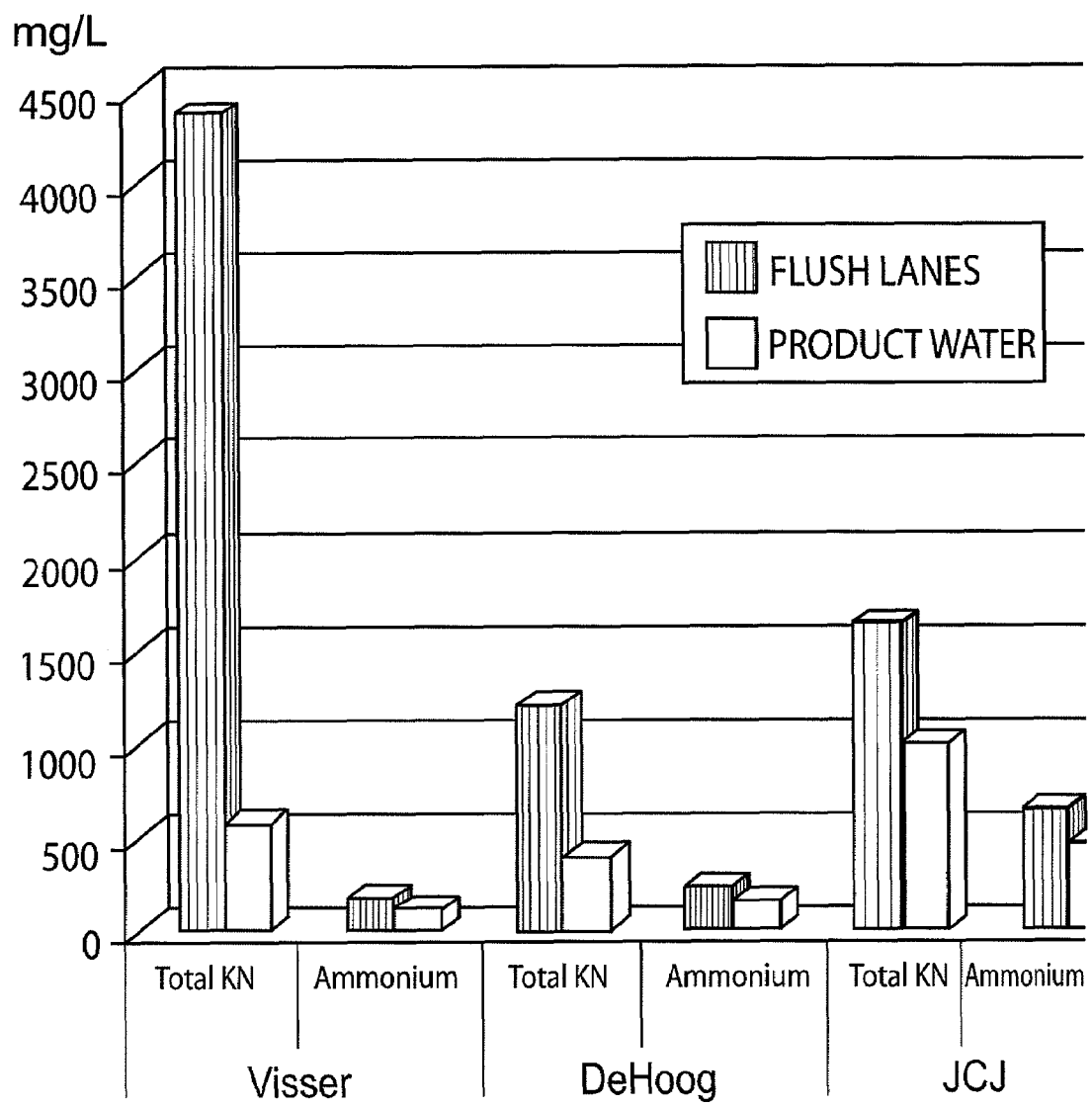
FIG. 11 illustrates the TKN and ammonia nitrogen decrease of three experimental embodiments of the present invention.

The nitrogen sources in the undigested flush lanes solution contain a complex mixture of nitrogen compounds, which includes anything from proteins, individual amino acids, free ammonia nitrogen including ammonia, and ammonium ion as well as urea and nitrate ion. The inventive process includes the digestion and denitrification of the original flush lane solution. FIG. 11 illustrates the decrease in TKN and ammonia nitrogen of three experimental embodiments of the present invention. The Visser Dairy, which does not have a solid separator, is the most efficient system and has been in operation for the longest time. The digestion ponds at the Visser Dairy are deeper and have the longest retention time of any of the systems tested.

Figure 12:
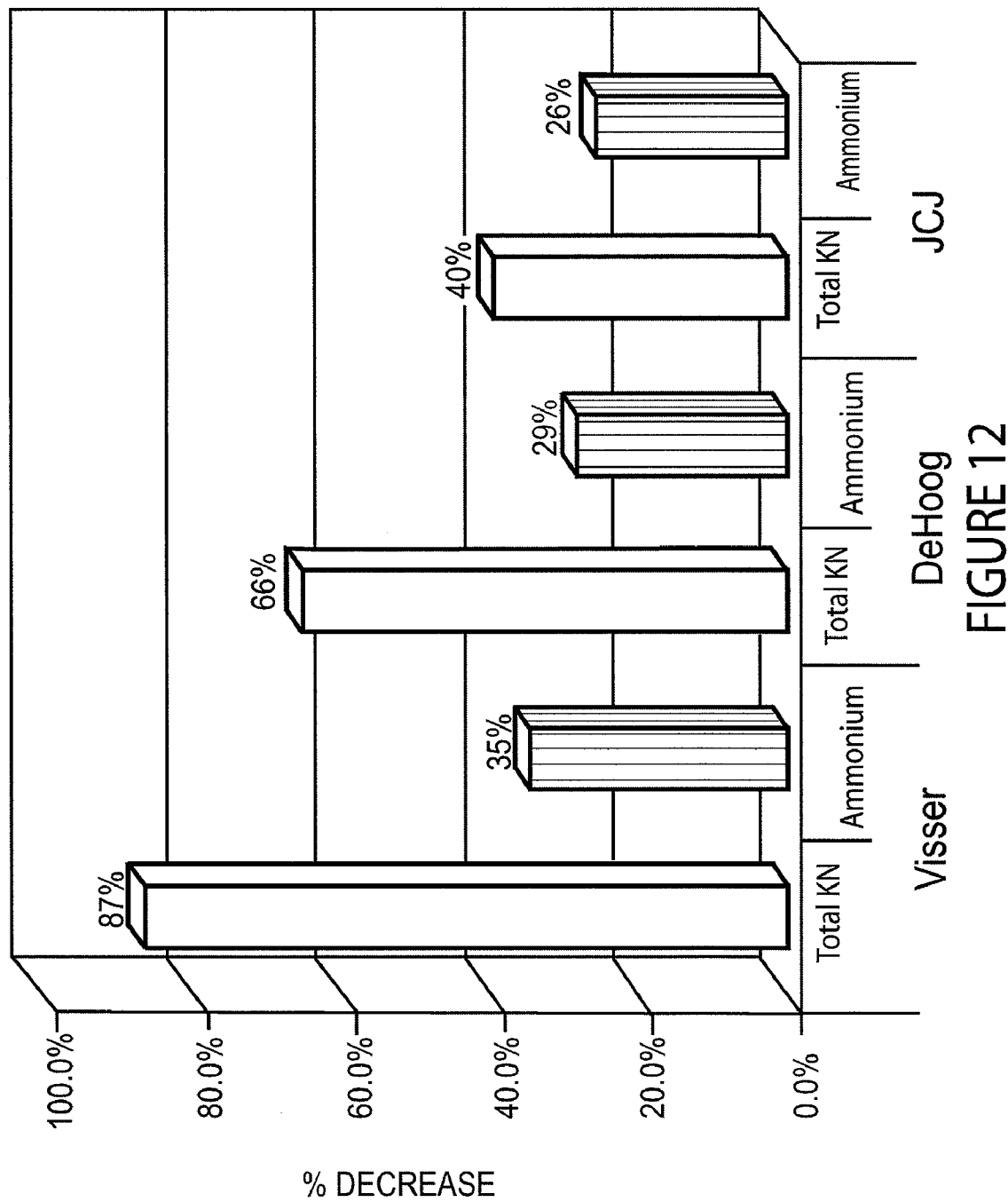
FIG. 12 illustrates the percent decrease in TKN and ammonium nitrogen of three experimental embodiments of the present invention.

The denitrification of the ponds, the reduction of the more complex nitrogen compounds to nitrogen gas, $N_2$, decreases the potential contamination of the groundwater. The 87% reduction in the Total Kjeldahl Nitrogen and the 35% reduction in the ammonia nitrogen at the Visser Dairy provide a measure of the efficiency of this process when ideal conditions are maintained. The DeHoog Dairy, which has very shallow ponds, still shows 66% efficiency in the reduction of the TKN and a 29% reduction of the ammonia nitrogen has no solid separator. The JCJ Dairy, which utilizes a solid separation system, shows a 40% TKN reduction and a 26% reduction of the ammonia nitrogen. The reduced efficiency at the JCJ operation may be associated with the ECw being 2.3 times as high in the digestion pond than at the other dairies. The product water at the JCJ Dairy is also reused in the flush lanes leading to the higher salt concentration in the digestion ponds. It should be noted that the product water from all three dairies continues to have undetectable concentrations of nitrate ion. FIG. 12 illustrates the percent decrease in TKN and ammonium nitrogen of three embodiments of the present invention.

Figure 13:
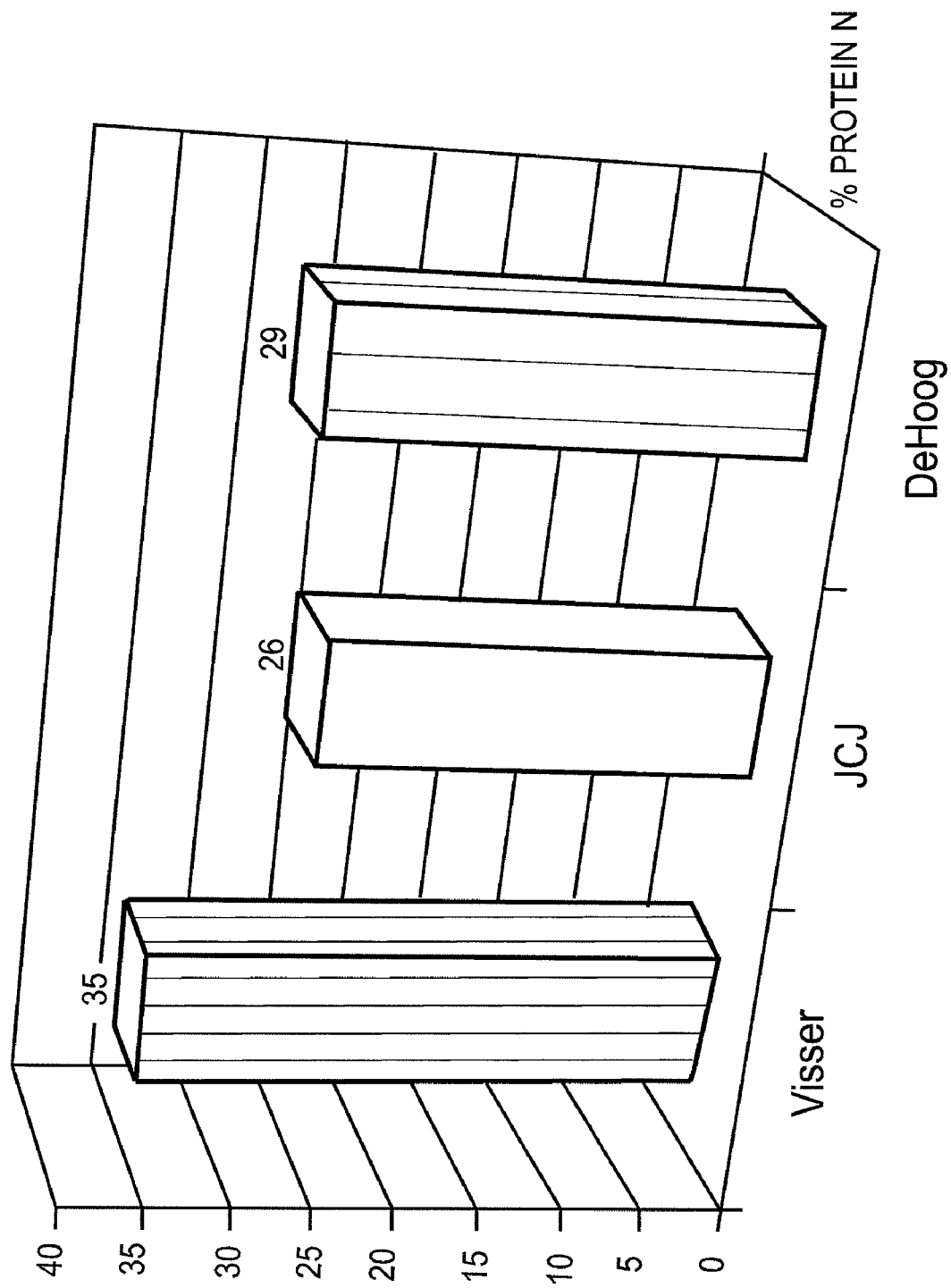
FIG. 13 illustrates the percent nitrogen in the product water for three experimental embodiments of the present invention.

It should be noted that the product water still contains some complex nitrogen compounds such as amino acids. These amino acids have been shown to help to complex or chelate micronutrient metal ions and allow them to be more easily transferred across the root's membrane. In earlier tissue analysis of silage corn, it has been shown that both the zinc and manganese concentrations were greatly enhanced when the aerobically digested water was used for irrigation resulting in 40% higher protein content and 30% greater yield. FIG. 13 illustrates the percent nitrogen in the product water for three experimental embodiments of the present invention.

Figure 14:
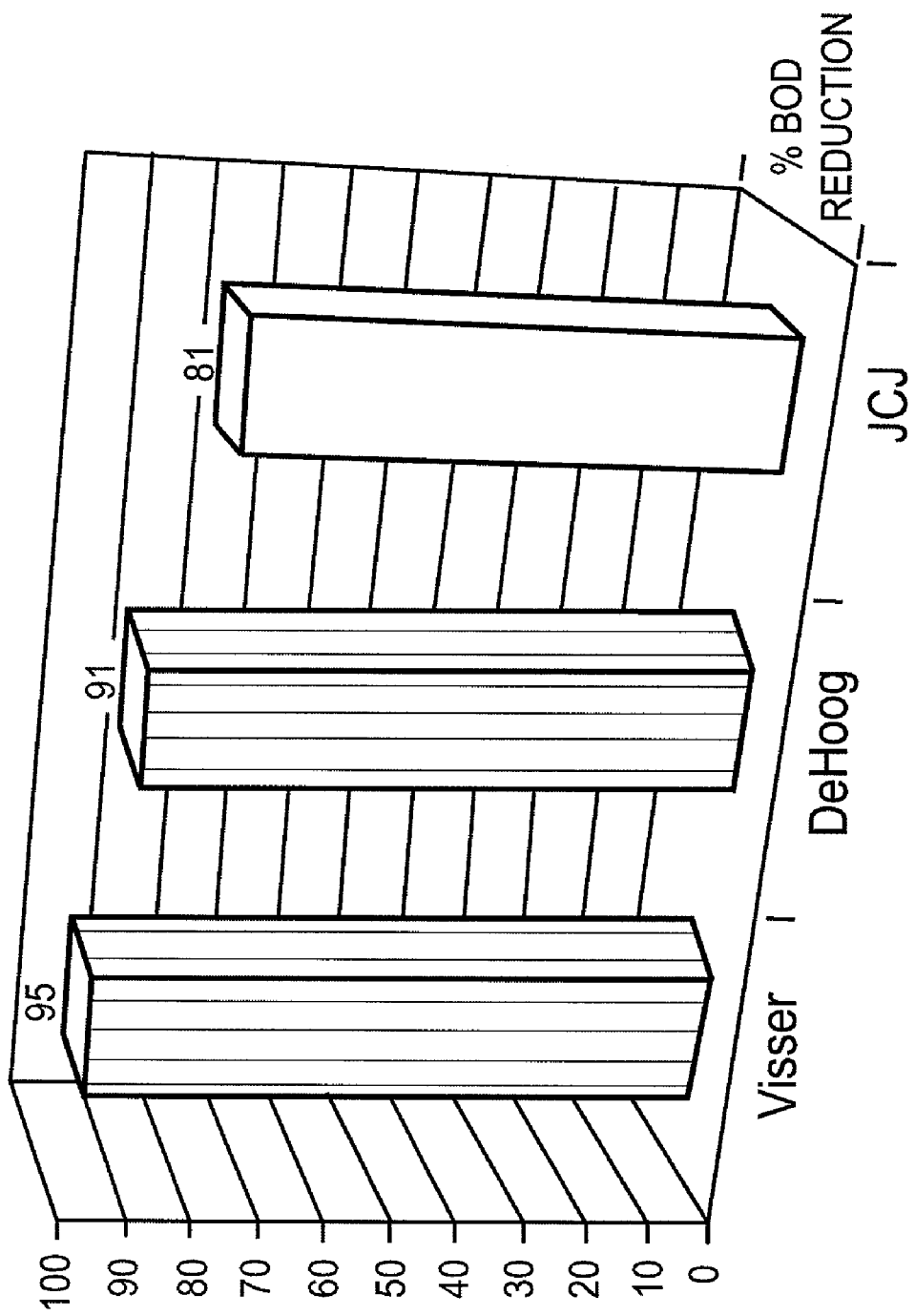
FIG. 14 illustrates the decrease in biological oxygen demand for three experimental embodiments of the present invention.

The BOD was determined for the flush lane solutions and the product water for each of the dairies. The results of these analyses are shown in FIG. 14. It should be noted that each of the dairy operations shows fairly efficient BOD reduction, but as might be expected the Visser system is the most efficient and the JCJ the least efficient. The JCJ Dairy operation was still over 80% efficient in the digestion of the original organic matter in the pond solution. The digestion process depends on a number of factors only one of them being the salt concentration. The process is observed to be more efficient during the warmer months.

As the organic matter is efficiently digested in the present invention, the BOD is decreased by as much as 95%. The organic matter that might have loaded the soil and decrease the available soil oxygen has been greatly reduced and the soil oxygen remains more available. With more availability of oxygen in the soil a much healthier soil environment can be maintained for the critically important aerobic soil organisms. If oxygen rich conditions are maintained in the soil ecosystem, the critical balance of all organisms can not only exist but also thrive. Once these balanced conditions are established and maintained most soil born diseases are held in check by these healthy competing organisms.

Summary of Experimental Results:

The average 44% decrease in the Electrical Conductivity, EC, between the flush lanes and the product water, corresponds to a decrease of 3.4 tons of salt per in an acre-foot. This should allow the dairy to maintain more animal units at a particular dairy site if the present inventive method of aerobic digestion is maintained.

The continued efficient operation of the present inventive process is documented by the aerobic BOD reduction. An average of 90% reduction of the organic material suspended in the water from the flush lanes continues to be observed.

The denitrification, the conversion of the more complex nitrogen compounds to inert $N_2$ gas, shows an average efficiency of approximately 64% and as high as 87% reduction. The decrease in the total nitrogen minimizes the possibility of nitrate contamination of ground water when the product water is used for irrigation purposes. The nitrogen utilized by irrigated crops can further reduce the possibility of nitrate contamination of the ground water.

The average documented 90% decrease in BOD, and the average lowering of the ECw by 44%, a decrease of 3.4 tons of salt per acre-foot of water, allows this product water to be used for irrigation without creating anaerobic or problem saline conditions in the soil.

The foregoing description of the invention has been presented for purposes of illustration and description. It is not intended to be exhaustive or to limit the invention to the precise form disclosed, and obviously many modifications and variations are possible in light of the above teachings. The embodiments were chosen and described in order to best explain the principles of the invention and its practical application to thereby enable others skilled in the art to best utilize the invention in various embodiments and with various modifications as are suited to the particular use contemplated. It is intended that the appended claims be construed to include other alternative embodiments of the invention except insofar as limited by the prior art.

What is claimed is:

1. A method for treating biological waste containing at least one target species, comprising:
   introducing the waste into a first water filled lagoon;
   adding to the first water filled lagoon, at least one microbe effective for converting the at least one target species in the waste to at least one other species;
   aerating the first water filled lagoon with a plurality of aerators dispersed on the bottom of the first water filled lagoon, the aerators adapted to produce a laminar column of bubbles, the aerators being supplied by a first compressed air supply;
   circulating the first water filled lagoon with at least one circulator adapted to cause the first water filled lagoon to circulate;
   sending a portion of the water filled lagoon to a second water filled lagoon;
   aerating the second water filled lagoon with a plurality of aerators dispersed on the bottom of the second water filled lagoon, the aerators being supplied by a second compressed air supply; and
   circulating the second water filled lagoon with at least one circulator adapted to cause the second water filled lagoon to circulate.

2. The method of claim 1 wherein the aerators in the second lagoon are adapted to produce a laminar column of bubbles.

3. The method of claim 1 wherein the first compressed air supply is enriched with ozone.

4. The method of claim 1 wherein the first compressed air supply is enriched with oxygen.

5. The method of claim 1 wherein the at least one target species is selected from the group consisting of straw, polysaccharides, cellulose, nitrite, nitrate, ammonia, phosphorus, pectin, hydrocarbons, fats, oils, proteins, agar, keratin, volatile organic compounds, hydrogen sulfide, lignin, and paper.

6. The method of claim 1, wherein said at least one microbe is selected from the group consisting of *Bacillus amyloliquefaciens, Bacillus brevis, Bacillus cereus, Bacillus circulans, Bacillus cougulans, Bacillus firmus, Bacillus halodenitrificans, Bacillus laterosprorus, Bacillus licheniformis, Bacillus megaterium, Bacillus myocoides, Bacillus pasteurii, Bacillus polymyxa, Bacillus subtilis, Nitrobacter, Nitrosomonas europea, Pseudomonas putida, Rhodobacter sulfidophilus, Saccharomyces, Streptomyces badius, Thiobacillus*, and mixtures thereof.

7. A method for the treating biological waste containing at least one target species, comprising:
   introducing the waste into a lagoon;
   adding to the lagoon at least one microbe effective for converting the at least one target species in the waste to at least one other species; and
   aerating the lagoon using a plurality of aerators located on the bottom of the lagoon, the aerators being adapted to produce a laminar column of bubbles.

8. The method of claim 7 wherein the at least one target species is selected from the group consisting of straw, polysaccharides, cellulose, nitrite, nitrate, ammonia, phosphorus, pectin, hydrocarbons, fats, oils, proteins, agar, keratin, volatile organic compounds, hydrogen sulfide, lignin, and paper.

9. The method of claim 7, wherein said at least one microbe is selected from the group consisting of *Bacillus amyloliquefaciens, Bacillus brevis, Bacillus cereus, Bacillus circulans, Bacillus cougulans, Bacillus firmus, Bacillus halodenitrificans, Bacillus laterosprorus, Bacillus licheniformis, Bacillus megaterium, Bacillus myocoides, Bacillus pasteurii, Bacillus polymyxa, Bacillus subtilis, Nitrobacter, Nitrosomonas europea, Pseudomonas putida, Rhodobacter sulfidophilus, Saccharomyces, Streptomyces badius, Thiobacillus*, and mixtures thereof.

10. The method of claim 7, wherein the aerators are supplied with compressed air that has been enriched with ozone.

11. The method of claim 7, wherein the aerators are supplied with compressed air that has been enriched with oxygen.

* * * * *